United States Patent [19]

Eidsmore

[11] Patent Number: 5,058,935
[45] Date of Patent: Oct. 22, 1991

[54] FLUID FITTING WITH TORQUE SUPPRESSION ARRANGEMENT

[76] Inventor: Paul G. Eidsmore, 2 Blue Hill Ct., Scotts Valley, Calif. 95066

[21] Appl. No.: 468,583

[22] Filed: Jan. 23, 1990

[51] Int. Cl.⁵ .............................................. F16L 35/00
[52] U.S. Cl. .................................. 285/330; 285/353; 285/384
[58] Field of Search ............... 285/330, 353, 384, 328, 285/322, 323

[56] References Cited

U.S. PATENT DOCUMENTS

| | | | |
|---|---|---|---|
| 748,546 | 12/1903 | Vail | 285/330 X |
| 2,016,262 | 10/1935 | Arey et al. | 285/330 |
| 2,496,402 | 2/1950 | McVeigh et al. | 285/323 X |
| 2,761,702 | 9/1956 | Noel | 285/323 |
| 3,482,860 | 12/1969 | Dawban et al. | 285/354 |
| 3,521,910 | 7/1970 | Callahan et al. | 285/328 X |
| 3,563,575 | 2/1971 | Sanford | 285/323 |
| 4,138,145 | 2/1979 | Lawrence | 285/323 X |
| 4,854,597 | 8/1989 | Leigh | 285/328 |

Primary Examiner—Dave W. Arola
Assistant Examiner—Carol I. Bordas
Attorney, Agent, or Firm—Fay, Sharpe, Beall, Fagan, Minnich & McKee

[57] ABSTRACT

A tube coupling comprises first and second coupling components each having flow passages terminating in openings formed in transversely extending sealing end faces positioned in aligned face-to-face relationship. First and second threaded nut members are associated with the coupling components and cooperate to drive the sealing end faces together. An annular drive member is located between the first nut member and the first coupling member for conducting axial forces from the first nut member to the first coupling component while preventing relative rotation between the first coupling component and the second nut member. To accomplish this function the drive member has a tapered exterior which wedges in a tapered recess in the second nut member.

9 Claims, 2 Drawing Sheets

FLUID FITTING WITH TORQUE SUPPRESSION ARRANGEMENT

BACKGROUND OF THE INVENTION

The subject invention is directed toward the art of pipe joints and couplings and, more particularly, to an improved tube coupling. The coupling of the invention is particularly suited for use in ultra-high vacuum applications and will be described with reference thereto; however, it should be appreciated that the invention is capable of broader application and could be used in different fluid systems under operating under a variety of conditions.

In U.S. Pat. No. 3,521,910 to Callahan, et al. there is disclosed a tube coupling which has achieved commercial success and is widely used in both pressure and vacuum operations. It does, however, find widespread acceptance for use in ultra-high vacuum applications.

The coupling of the noted patent generally comprises first and second annular coupling components having axial through passages and end faces which extend perpendicular to the axis of the passages. The end faces provide sealing surfaces for the coupling end and typically include an annular rib, or bead-like protuberance generally of hemispherical cross-section, which extends outwardly from each end face about the through passage. Typically, a smooth, flat annular meral sealing gasket is trapped between the opposed end faces. A threaded coupling nut or nuts act to drive the coupling components toward one another to produce sealing engagement of the annular ribs with opposite side faces of the annular sealing gasket. During make-up of the coupling, it is highly preferable that relative rotation between the coupling components and the sealing washer be minimized. That is, it is desirable to suppress or eliminate any such relative motion which could produce undesirable scoring or gauling of the sealing washer and/or the sealing end faces. Such scoring or galling can drastically reduce the effectiveness of the joint. In fact, under certain circumstances, leaks can develop and the ability to remake the joint after disassembly can be lost.

In an effort to prevent the relative rotation and reduce torques transmission from the coupling nut to one or the other of the coupling components, it has been proposed to install anti-friction thrust bearings between the coupling nut and the associated coupling component. The driving forces from the coupling nut to the coupling components are thus directed through the thrust bearings. Hopefully, the bearings transmit the forces without the transmission of torque to the coupling components. Both standard and special ball and needle type thrust bearing assemblies have been used for this purpose.

Although the thrust bearing approach has been somewhat satisfactory, it is generally undesirable in that it significantly increases the cost and complexity of the coupling assemblies. Moreover, the addition of the anti-friction thrust bearings can significantly increase the overall length of the coupling assemblies. Accordingly, there has existed an ongoing need for a design to prevent relative rotary movement between the sealing faces of the coupling components and/or between the coupling components and the seal ring.

BRIEF DESCRIPTION OF THE INVENTION

The subject invention provides a coupling structure which overcomes the noted problem in an extremely efficient and economical manner. In particular, and in accordance with one aspect of the invention, a coupling assembly of the general type described is provided with a drive means that is in the form of an annular drive member located between one of the coupling nuts and its associated coupling member for conducting axial forces from the nut member to the coupling component while preventing relative rotation between the coupling component and the other coupling nut member. Further, the drive member preferably includes at least one axially extending portion which is frictionally engaged in a recess in the other nut member to prevent relative rotation between the drive member and the other nut member.

The axially extending portion and its engagement with the second nut member acts to drastically reduce or eliminate any possible relative rotation between the drive member and the other nut member. The arrangement between the drive member and other coupling nut member is such that all forces applied to the opposed coupling components during tightening of the coupling nut members are axially directed forces which drive the sealing faces toward one another without producing a relative rotation therebetween.

In accordance with a somewhat more limited aspect of the invention, the drive member includes an annular body having a drive face captured between the first coupling nut and the first coupling member. The axially extending portion preferably has a generally wedged shape cross-section which produces a wedging and locking action between the first coupling member and the second nut member. Engagement and wedging takes place during the make-up of the coupling.

In accordance with a still more limited aspect of the invention, the drive member completely encircles the first coupling member and the wedge shape is produced by a conical surface formed circumferentially of the drive member. Preferably the interior of the second coupling nut has a conical shape which engages the concical surface on the drive member.

The various components are sized such that a positive wedging action takes place between the drive member and the second coupling member prior to sealing engagement occurring between the end faces of the coupling members and/or the gasket member.

The design represents a significant improvement as compared to the use of anti-friction thrust bearings. In particular, use of the annular drive member does not significantly increase the length of the overall tubing assembly. Further, the drive members can be produced at a significantly lower cost than suitable anti-friction thrust bearings. The design also can result in near total elimination of torque transmission.

Accordingly, a primary object of the invention is the provision of a tube coupling of the type described wherein relative rotational movement between the coupling components and the sealing faces or sealing gaskets is eliminated.

A still further object is the provision of a coupling of the type described wherein the relative rotation movement between the coupling components is eliminated without the use of a special bearing and without significantly increasing the overall length and complexity of the coupling assembly.

Yet another object is the provision of a tube coupling of the type described which has means which allow coupling make-up to be achieved without scoring or gauling of the sealing faces.

A still further object is the provision of a coupling of the type described which achieves the results desired without increasing the forces required for coupling make-up.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 1:
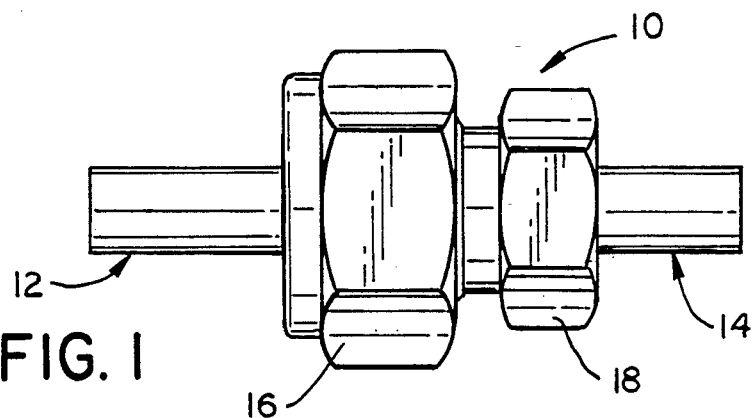
FIG. 1 is a side view of a coupling assembly formed in accordance with a preferred embodiment of the subject invention.
Figure 2:
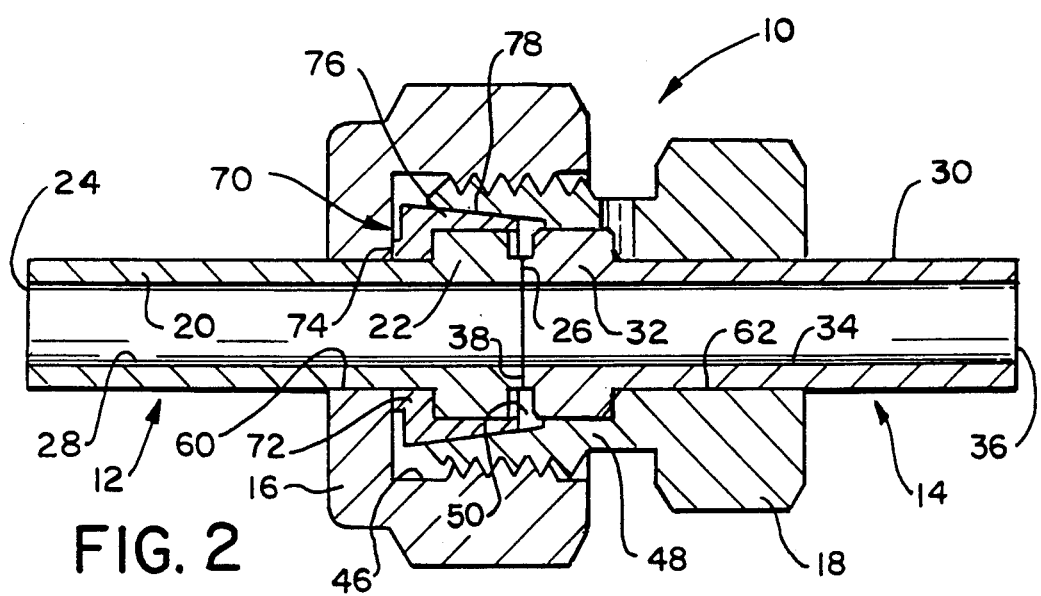
FIG. 2 is a longitudinal cross-sectional view taken on line 2—2 of FIG. 1 and showing the coupling components in their assembled condition.
Figure 3:
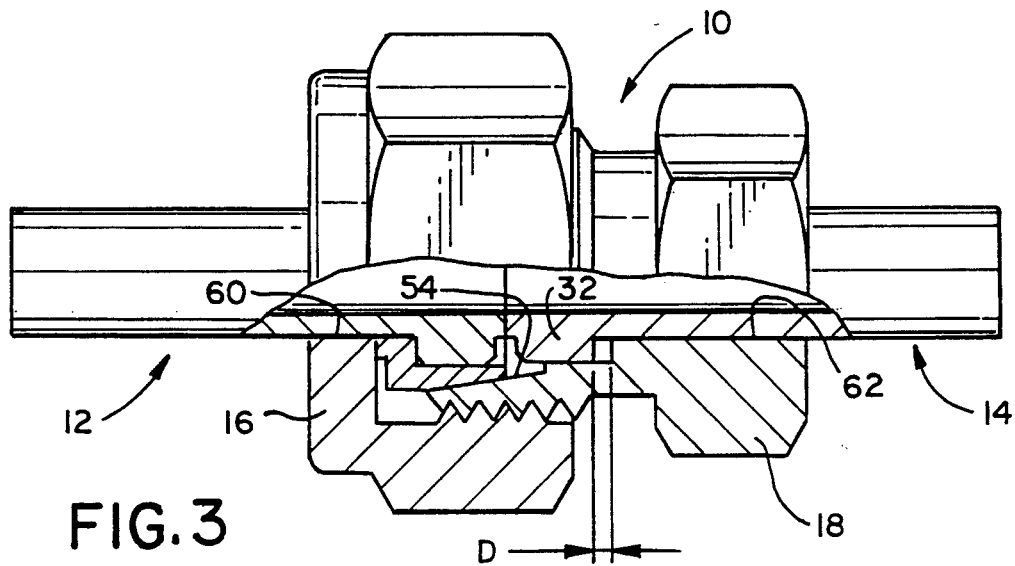
FIG. 3 is a partial cross-sectional view similar to FIG. 2 but showing the components before final tightening.

Referring more particularly to the drawings wherein the showing are for the purpose of illustrating a preferred embodiment of the invention only, and not for the purpose of limiting same, FIGS. 1-3 best illustrate the overall arrangement of a coupling assembly 10 formed in accordance with the preferred embodiment of the invention and generally comprising a first coupling component 12 and a second coupling component 14. The components 12 and 14 are joined by cooperating first and second coupling nuts 16 and 18 respectively. As best seen in FIG. 2, the first coupling component 12 includes first and second cylindrical sections 20 and 22. The cylindrical section 22 comprises an enlarged generally flanged-like portion formed adjacent one end of component 12. Component 12 terminates in first and second end faces 24 and 26 which are generally perpendicular to a central axially extending through passage 28. The end 24 is adapted to be connected to associated fluid flow lines or the like. In the subject embodiment, end 24 is intended to be butt welded to the associated lines. It should, of course, be understood that many types of end fittings or connectors could be used. Likewise, the component 12 could be an integral part of the association flow line.

The end face 26 of the coupling component 12 is the sealing face and, as will subsequently be described, cooperates with a corresponding seal face formed on coupling component 14.

In the subject embodiment, the second coupling component 14 is illustrated as having a design and configuration substantially identical to the coupling component 12. More particularly, coupling component 14 comprises a first cylindrical body section 30 and a somewhat larger body section 32. A flow passage 34 extends axially throughout the length of the coupling member 14 and terminates in end faces 36 and 38. The end face 38 acts as the sealing face for cooperation with face 26 of the coupling component 12.

In the embodiment under consideration, the coupling components 12 and 14 are arranged such that their respective end faces 26, 38 are brought into face-to-face and metal-to-metal sealing contact by actuation of the respective coupling nuts 16 and 18. As shown in FIG. 5, the invention is equally applicable to the somewhat more conventional coupling wherein the mating coupling component faces each have a suitable bead-like protrusion to engage in opposite side faces of an intermediate gasket member. This arrangement is shown in FIG. 5. In this FIG. 5 showing, parts corresponding to those shown in the FIGS. 1-4 embodiment, have been identified with the same numeral bearing a prime (') suffix. The description of any such component is to be believed taken as equally applicable unless otherwise noted.

Referring more particularly to FIG. 5 showing, it will be noted that the coupling component 12' and the mating coupling component 14' each have their respective end faces 26' and 38' provided with hemispherical bead-like protrusions 40. These hemispherical protrusions are highly polished and arranged to be driven into sealing engagement with the opposite side faces of a flat annular metal gasket 42. This is a relatively conventional arrangement well known in the art and could be used with the coupling of the FIG. 1 embodiment.

Referring again to FIGS. 1-4, it will be understood that the sealing end faces 26, 38 are driven together into sealing arrangement by use of the coupling nuts 16, 18. As illustrated in FIG. 1, the coupling nuts 16, 18 preferably have a hex shaped exterior to provide suitable tool receiving surfaces in the form of wrench flats to allow the necessary tightening forces to be applied thereto. More particularly, the first coupling nut 16 is shown as having a threaded inwardly extending opening 46 which is adapted to receive a threaded male end portion 48 on the second nut member 18. The end portion 48 includes an inwardly extending mouth or chamber defining section 50.

Figure 4:
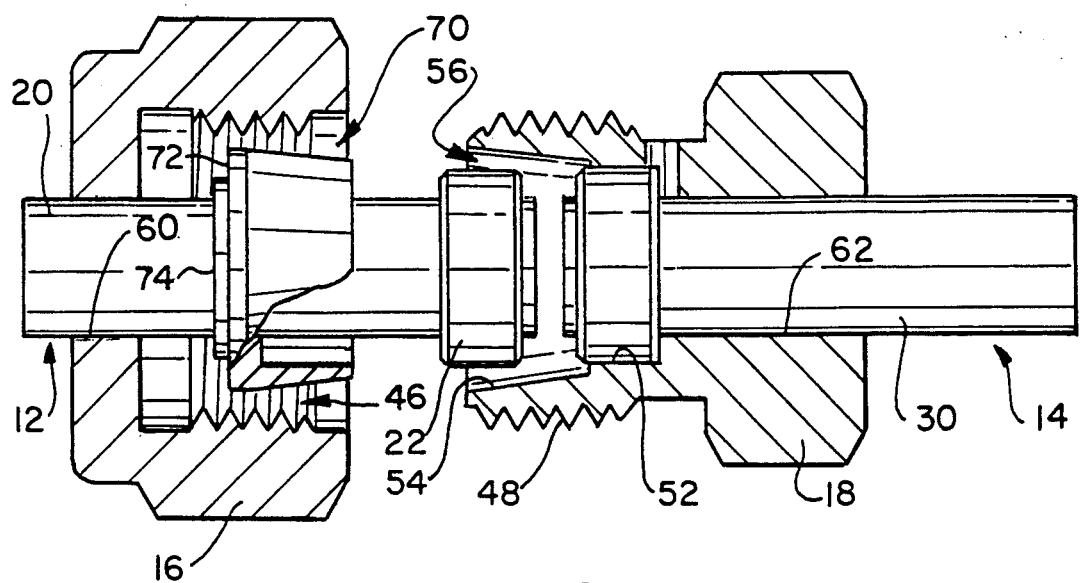
FIG. 4 is an exploded view (partially in cross-section) showing the various components of the assembly of FIG. 1; and, FIG. 5 is a partial cross-sectional view similar to FIG. 2 but showing a modified form of the coupling.
Figure 5:
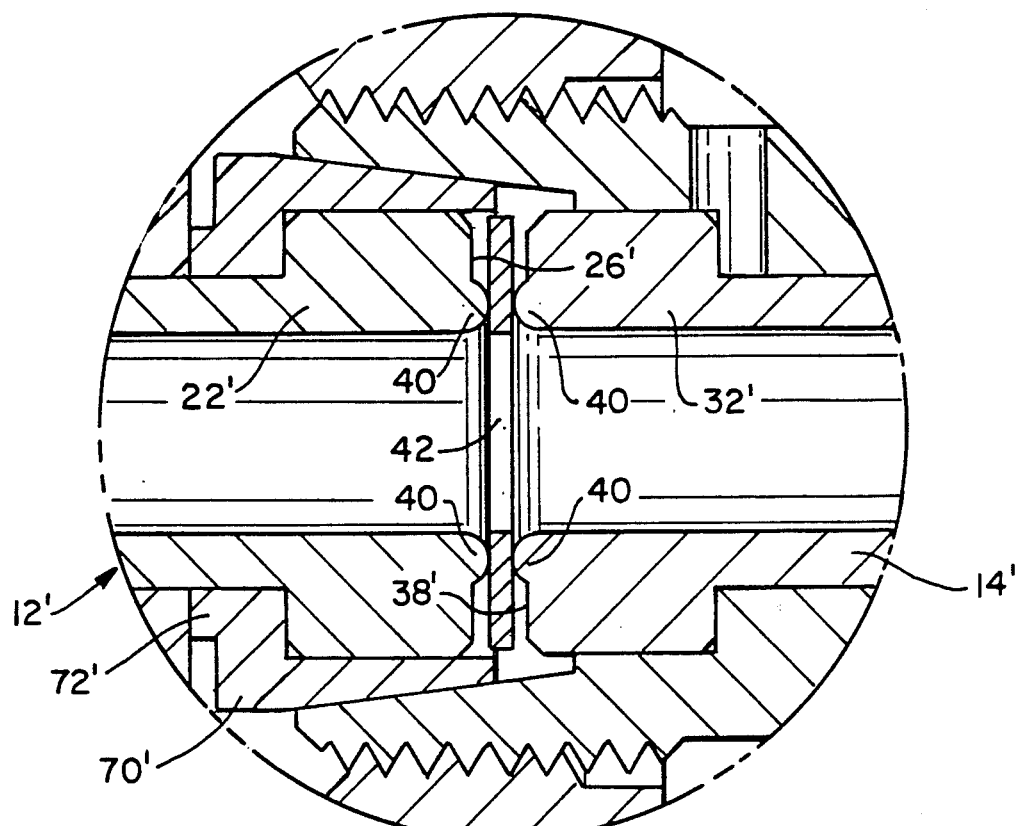

FIG. 4 illustrates the various components in their partially disassembled condition. As shown therein, the mouth 50 of the nut member 18 includes a first generally cylindrical section 52 which is arranged to closely receive the flanged end 32 of the second coupling member 14. The outer terminal end portion of the mouth 50 is conically shaped and tapered so as to provide a circumferential tapered or wedged shaped recess about the end 22 of the first coupling member 12. This recess is identified with the numeral 56 and extends circumferentially completely about the end 22 when the components are in the assembled position. It should also be noted that each of the nut members 16 and 18 is provided with an axially extending opening 60, 62 which respectively receive the end sections 20, 30 of the two coupling components 12-14. These openings 60, 62 are located so as to maintain the end faces 26, 38 of the coupling components 12 and 14 in axial alignment during fitting make-up.

As previously discussed, make-up of prior art fittings of the general type under consideration resulted in the application of torque from, for example, fitting nut 16 to the coupling component 12. This tended to produce relative rotation between the coupling components and twisting or relative movement between the sealing end faces of the fitting components or between the sealing end faces and an associated gasket member. Such relative movement sometimes produced a scoring and/or a galling and loss of sealing effectiveness of the fitting. As a result, the fittings leaked or even if they did not leak on original make-up would sometimes leak on a subsequent disassembly and re-make.

The subject invention provides an arrangement which eliminates the possibility of such undesired torque transmission and relative rotation. In particular, referring to FIGS. 2-4, the subject invention incorporates a drive member 70 which is located between one of the nut members and the associated coupling member. In the embodiments illustrated, the member 70 is located between the first nut member 16 and the first coupling member 12. More particularly, and as best illustrated in FIG. 4, the drive member 70 has a generally annular first body section 72 which is closely received about the cylindrical section 20 of the first coupling member 12. The end face 74 of the body section 72 functions as a drive surface for receiving the forces applied through the coupling nut 16. As illustrated, the surface 74 preferably lies parallel to the inner drive surface of nut member 16. Additionally, surface 74 is preferably located radially inwardly to the maximum extent possible.

The drive member 70 further includes a radially outward and axially extending section 76 which has a tapered exterior 78 corresponding in size and shape to the inner surface 54 of the mouth 50 on coupling nut 18. As illustrated, the cross section of this portion 76 has a generally wedge shape and provides an opening for closely receiving the enlarged end 22 of the coupling member 12.

Upon assembly and make-up of the fitting, the components are first generally assembled in the relationship shown in FIG. 4 and then the coupling nuts 16 and 18 are threaded together to bring the various components into a finger-tight position shown in FIG. 3. In this position, the drive member 70 has moved into engagement with the inclined surface 54 of the mouth 50 of coupling nut 18. The right-hand face of the enlarged end portion 32 of the coupling member 14 has not yet bottomed out in the cylindrical opening 52. Rather, it is spaced outward a short distance D determined by the dimensional relationships of the various components. This dimension must, however, be relatively small as will become apparent. With further tightening of the nuts 16 and 18 a locking takes place between the drive member 70 and the nut 18. That is, the wedge shaped section 76 is driven into the wedge shaped recess 56 producing a wedging and locking action. This prevents relative rotation between the coupling nut 18 and the coupling component 12. It should, of course, be understood that this also prevents any chance of rotation taking place between the sealing end faces or between the coupling components and an associated gasket member. The locking and corresponding elimination of torque transmission is further enhanced by the radial location of the locking surface 78 relative to the drive surface 74. That is, the surface 78 is located outwardly at a greater radial distance than surface 74. Thus, surface 74 has a greater moment arm to better resist the rotary force components applied to surface 74. In addition, the greater surface area of surface 78 relative to surface 74 further enhances this relationship and reduces the likelihood that frictional rotational of forces applied to surface 74 by nut 16 would ever be sufficient to overcome the frictional locking forces generated between surface 78 and the surface 54 of nut member 18.

What is claimed is:

1. A tube coupling comprising:

first and second annular coupling components having axial openings and end portions with transversely extending sealing end faces;

said first and second annular coupling components being positioned with said sealing end faces in aligned face-to-face relationship and adapted to move into sealing engagement;

threaded means including a first nut member and a cooperating threaded portion associated with said second coupling member arranged such that rotation of said first nut member in a first direction produces movement of said sealing end face of said first coupling member axially toward said sealing end face of second coupling member;

said first nut member and said cooperating threaded portion defining a closed chamber which encloses said sealing end faces of said first and second coupling components;

drive means in said chamber, said drive means including an annular drive member having a drive surface for transmitting axial movement from said first nut member to said first coupling member, and a wedge surface located radially outwardly of said drive surface and engaged with said cooperating threaded portion for locking said drive member against rotational movement relative to said cooperating threaded portion.

2. A tube coupling as defined in claim 1 wherein said cooperating threaded portion is carried on a second nut member, and wherein said second nut member includes a circumferentially continuous tapered surface for engaging said wedge surface on said drive member.

3. A tube coupling as defined in claim 1 wherein said wedge surface is formed on the exterior of said drive member.

4. A tube coupling as defined in claim 1 wherein said drive member encircles said first coupling member and said wedge surface is formed by a first conical surface.

5. A tube coupling as defined in claim 4 wherein said drive surface comprises a circumferentially continuous end surface on said drive member.

6. A tube coupling as defined in claim 4 wherein said cooperating threaded portion is a second nut member which includes a conical interior surface which engages the first conical surface on said drive member.

7. A tube coupling as defined in claim 4 wherein said first conical surface faces radially outwardly.

8. A tube coupling as defined in claim 7 wherein said first conical surface is located at a position which is axially spaced from said drive surface.

9. A tube coupling comprising:

first and second coupling components each having flow passages terminating in openings formed in transversely extending end faces;

said first and second coupling components being positioned with said end faces in aligned face-to-face relationship and adapted to move into sealing engagement;

first and second nut members associated respectively with said first and second coupling components and cooperating to define a chamber about the end faces of said first and second coupling components, said first and second nut members being joined by threaded portions arranged such that rotation of said first nut member in a first direction relative to said second nut member produces movement of said first nut member axially toward said second nut member; and, drive means including an annular drive member located between said first nut member and said first coupling member for conducting axial forces from said first nut member to said first coupling component while preventing relative rotation between said first coupling component and said second nut member, said drive member including at least one axially extending portion engaged in a tapered recess in said second nut member to prevent relative rotation between said drive means and said second nut member.

* * * * *